United States Patent Office 3,163,679
Patented Dec. 29, 1964

3,163,679
PROCESS FOR THE PRODUCTION OF ALKALI BORON TETRAALKYLS
Roland Köster, Mulheim (Ruhr), Germany, assignor to Karl Ziegler, Mulheim (Ruhr), Germany
No Drawing. Filed Nov. 15, 1960, Ser. No. 69,275
Claims priority, application Germany Nov. 17, 1959
19 Claims. (Cl. 260—606.5)

This invention relates to a process for the production of alkali metal boron tetraalkyls.

It is known that olefins can be added to alkali metal aluminum tetrahydride. This reaction proceeds to completion with formation of alkali metal aluminum tetraalkyls, e.g.

$$LiAlH_4 + 4C_2H_4 = LiAl(C_2H_5)_4$$

In case of the corresponding alkali metal boronhydrides, the analogous reaction cannot be carried out successfully. If, for example, lithium boronhydride or sodium boronhydride is heated to boiling with an excess of an alpha olefin such as alpha octene, the complex alkali metal boronhydrides remain suspended in the olefin completely unchanged, and not the least indication of a reaction is perceivable even after boiling for days. Similar observations are made when suspending the above-mentioned complex hydrides in a hydrocarbon such as hexane and heating the suspension in an autoclave with excess ethylene or propylene under pressure. Here again, the complex hydrides remain completely unchanged.

The low reactivity of the complex compounds is largely in contrast to the ease with which free diborane reacts with olefins. It adds olefins even at room temperature with formation of the corresponding boron trialkyls. However, this contrary behavior is not particularly surprising, for it is in good agreement with the great change in properties which is otherwise also observed in case of the conversion of diborane into the associated complex alkali metal boronhydrides. It should be remembered that diborane is extremely sensitive to water and generally to compounds containing mobile hydrogen such as alcohols. It forms boric acid or boric acid esters with these substances with the evolution of hydrogen. On the other hand, the complex sodium and potassium boronhydrides are very stable to water and it is possible, for example, to produce potassium boronhydride by treating an aqueous solution of sodium boronhydride wtih potassium chloride.

From this behavior of sodium boronhydride with respect to olefins, the skilled artisan necessarily arrived at the conclusion that the boron-hydrogen bond in complex boron compounds of this kind reacts very slowly with olefins, which is in contrast to the aluminum-hydrogen bond of which it is known that it adds olefins in any case in both non-complex and complex compounds. This supposition would be consistent with further known observations according to which very great differences exist between the complex hydrides of aluminum and those of boron with respect to stability and reactivity. Thus, for example, the complex hydrides of aluminum are immediately destroyed when coming into contact with water. They react very readily with carbonyl compounds such as ketones while a smooth reaction of sodium boronhydride with ketones can only be achieved in the presence of specific catalysts.

According to a suggestion made by H. C. Brown and B. C. Subba Rao (J. Am. Chem. Soc., vol. 78, 5694 (1956)), sodium boronhydride can be used to convert even olefins into boron trialkyls. However, the reaction is only successfully achieved when mixing sodium boronhydride with aluminum chloride in a molar ratio of 3:1. This results in the intermediary formation of aluminum boronhydride which is a distillable liquid and obviously has characteristics towards the olefins which are quite different from those of sodium boronhydride. This suggestion made by the two authors mentioned above very clearly shows that there does not exist the possibility of a reaction between olefins and the complex sodium boronhydride since otherwise this indirect route would hardly have been taken by the authors.

The surprising observation has now been made that the behavior the boron-hydrogen bond shows in complex boron compounds containing organic radicals is quite different from that in alkali metal boronhydrides. Materials of this type can be easily prepared. If, for example, alkali metal hydrides are added to boron trialkyls in a manner known per se, there are obtained complex compounds of boron wherein three valencies of the boron are already occupied by alkyls, e.g. according to the following reaction:

$$NaH + B(C_2H_5)_3 = Na[B(C_2H_5)_3H]$$

Surprisingly, the reactivity of compounds of such type is fundamentally different from that of the pure alkali metal boron hydride.

It is an object of the invention to provide a process for the production of complex alkali metal boron tetraalkyl compounds, which process comprises reacting complex alkali metal boron alkyl hydride compounds with olefins.

According to a preferred embodiment of the invention, use is made of complex alkali metal boron alkyl hydride compounds of the general formula $M[BR_1R_2R_3H]$ wherein M is an alkali metal, preferably lithium, sodium or potassium; $R_1$ and $R_2$ are like or different alkyl radicals which also may be closed to form a ring and may be straight-chained or branched; $R_3$ is an alkyl radical (straight-chained or branched) or a radical of the general formula $[R_4BR_5R_6H]M$ wherein $R_4$ is an alkylene radical (difunctional saturated aliphatic hydrocarbon radical) such as a polymethylene radical, and $R_5$ and $R_6$ are like or different straight-chain or branched alkyl radicals which may also be closed to form a ring.

In producing the compounds of the invention, it is particularly preferred to use complex compounds which are derived from the reaction of alkali metal hydride, especially sodium hydride, and boron trialkyl. Equally preferred are complex compounds from alkali metal hydride and borocycloalkanes of the general formula

and/or di-borocycloalkyl alkanes of the general formula

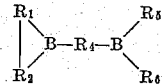

In these formulae, $R_1$, $R_2$, $R_4$, $R_5$, and $R_6$ have the meaning set forth above. In case of the compounds of the last-mentioned general formula, two mols of alkali metal hydride may enter the reaction per mol of organic boron compound. Thus, for example, compounds of the following structure are suited:

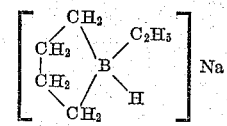

also suitable being, for example,

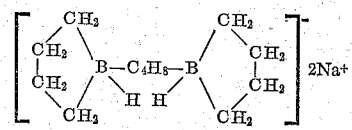

Besides the complex alkali metal alkyl hydride compounds, alpha olefins or 1,1-dialkyl ethylenes may be used in the process of the invention. Preferred are olefins containing a low and medium number of carbon atoms. Thus, olefins containing up to 20 carbon atoms and from these olefins containing from 2 to 12 carbon atoms in the molecule are particularly preferred. One of the most important olefins used in the process of the invention is ethylene.

The reaction of the components is effected by heating. Temperatures in excess of 120° C. are preferred, best results being generally obtained in a temperature range of between about 160° and about 200° C. The choice of the exact temperature is dependent upon the compounds to be reacted and is easily determined for the particular case.

If, in accordance with the invention, the mixture of alkali metal boron alkyl hydrides and olefins is heated, smooth addition to the alkali metal boron tetraalkyls will occur. Materials of this type are already described in literature. However, up to the present, they could only be prepared by adding finished alkali metal alkyls to boron trialkyls. The process of the invention eliminates the necessity of using the difficultly accessible metal alkyls, They are replaced in the reaction by the combination of alkali metal hydride plus olefin or alkali metal, hydrogen and olefin.

It is unimportant in case of the process of the invention whether or not the alkyl radicals in the boron trialkyl charged are like among themselves and the alkyl radicals newly formed by the addition of the olefin are identical with the alkyl radicals already existing at the boron. When being identical, uniform alkali metal boron tetraalkyls are obtained. When being not identical, mixed alkali metal boron tetraalkyls or, by disproportioning, mixtures of different alkali metal boron tetraalkyls are formed. The fundamental reaction of the invention is not influenced thereby.

The process of the invention may be carried out at atmospheric pressure and at elevated pressures. When operating with non-volatile olefins, the use of atmospheric pressure is quite sufficient. When operating with volatile and especially highly volatile olefins, the rate of the reaction may be increased by increasing the pressure. For example, when using ethylene, it is desirable to use pressures of about 20 to 50 atmospheres. These values are, of course, not to be understood as an upper limit of the pressure.

The reaction may be carried out in the presence of solvents. Particularly suitable solvents have been found to be saturated aliphatic and especially cycloaliphatic compounds. The alkali metal boron tetraalkyl compounds formed are instable to moisture and consequently to air which normally is somewhat humid. Therefore, the reaction is preferably effected under an inert gas atmosphere such as argon or nitrogen. When observing the reaction conditions described above, the reaction will have proceeded to a satisfactory extent within short periods of time such, for example, as within 1 to 2 hours. A still further facilitation of the reaction can be obtained by shaking or stirring during the reaction, i.e. by adequate agitation.

In carrying out the process of the invention, it appeared that the presence of a slight excess of the free boron alkyl compound may be desirable. This excess is capable of repressing decomposition reactions and consequently darkening of the reaction mixture. In normal cases, only a minor excess of, for example, in a molar ratio of 0.1 to 0.2 mol will be necessary. The practicability of the process of the invention is, on principle, independent of the existence of this excess. Merely the results of the process may be favourably influenced thereby in individual cases.

It is not necessary for carrying out the process of the invention to operate in two stages such that the complex alkali metal boron alkyl hydride compounds are first formed from alkali metal hydride and boron alkyl compounds and are reacted with the olefins in a subsequent reaction stage in accordance with the invention. It is rather possible in a modification of the process of the invention to operate in a single reaction stage by subjecting the alkali metal hydride, the boron alkyl compounds and the olefins commonly to the reaction. Isolation of the complex alkali metal boron alkyl hydride compounds is not necessary in this case. This embodiment of the process of the invention may, if desired, be modified by first reacting the alkali metal hydrides with the boron alkyl compounds and then causing the olefins to react in the same reaction vessel without insulating the first complex compound.

The compounds of the invention may be used for various applications. For example, they are suited as alkylating agents in organic chemistry or as reducing agents.

*Example 1*

122 gms. of liquid sodium boron triethyl hydride prepared from sodium hydride and boron triethyl are charged together with 10 gms. of boron triethyl into a 200 ml. autoclave under a protective gas atmosphere. Ethylene in amount of 35 gms. is introduced under pressure and the mixture is heated at 180–190° C. for 2 to 3 hours. In doing so, the pressure drops and reaches about 5 atmospheres upon cooling to room temperature. The excess ethylene (about 6 grams) is vented. Thereafter, the contents of the autoclave consist of a solid crystallized compound which is completely colorless after washing with benzene. Upon drying, 140 gms. (93.5% of the theory) of pure sodium boron tetraethyl (melting point, 143° C.) are obtained. One mol of the compound evolves one mol of ethane during the hydrolysis while cold. The boron and sodium contents correspond to the formula $Na[B(C_2H_5)_4]$.

In an analogous manner, lithium and potassium boron tetraethyl, respectively, are obtained from lithium and potassium boron triethyl hydride, respectively, with ethylene. (Melting point, 159° C.)

*Example 2*

Sodium boron tripropyl hydride (melting point, 60–61° C.) which may be recrystallized from benzene or hexane reacts with ethylene or propylene at temperatures of between 160 and 200° C. in accordance with Example 1 to form tetraalkyl complex compounds of the formula $Na[B(C_3H_7)_3C_2H_5]$ and $Na[B(C_3H_7)_4]$ (melting point, 148–150° C.).

*Example 3*

61 gms. of sodium boron triethyl hydride are dissolved in about 100 ml. of absolute perhydrocumene. This solution is heated to 150–160° C. (reflux) and 56 gms. of octene-1 are slowly added dropwise. Two liquid layers are formed to the extent of the reaction of the olefin. Thereafter, the solvent is distilled off under reduced pressure. The residue obtained is a viscous liquid having the composition $Na[B(C_2H_5)_3C_8H_{17}]$ (116 grams).

*Example 4*

96 gms. (1 mol) of B-ethylborolane (B-ethylborocyclopentane) are filled into an autoclave. Following this, 20 gms. of sodium hydride suspended in 300 ml. of perhydrocumene are allowed to flow in. Then 35 gms. of ethylene are introduced under pressure and the autoclave is heated for 2 to 3 hours at 170–190° C. After having vented the excess ethylene, the contents of the autoclave is discharged. Upon removal of the solvent by distillation the complex salt of the composition $Na[(C_2H_5)_2BC_4H_8]$ is obtained. The same complex salt is obtained when first dissolving sodium hydride in B-ethyl borolane and subsequently reacting the solution correspondingly with ethylene in an autoclave.

*Example 5*

40 gms. of sodium hydride are dissolved in 1 mol 1,1-tetramethylene diborolane (dissolved in 250 ml. of cyclohexane) in the presence of heat. The solution is then treated with ethylene under pressure in the manner described in Example 1. Removal of the solvent by distillation results in a salt-like residue which evolves ethane when mixed cold with water. The sodium content of this residue corresponds to the formula Na$_2$[(C$_4$H$_8$)(C$_2$H$_5$)B(C$_4$H$_8$)B(C$_2$H$_5$)(C$_4$H$_8$)]

What is claimed is:

1. A process of producing a complex alkali metal boron tetraalkyl which comprises reacting a complex alkali metal boron triorgano hydride with an olefin at a temperature in excess of 120° C. and in the absence of any catalyst, and recovering the complex alkali metal boron tetraalkyl thereby formed.

2. Process according to claim 1, wherein said complex alkali metal boron triorgano hydride has the formula M[BR$_1$R$_2$R$_3$H], wherein M is an alkali metal, R$_1$ and R$_2$ are each alkyl radicals which may be joined together to form a ring, R$_3$ is a member selected from the group consisting of alkyl radicals and radicals of the formula [R$_4$BR$_5$R$_6$H]M, wherein R$_4$ is an alkylene radical and R$_5$ and R$_6$ are each alkyl radicals, which may be joined together to form a ring.

3. Process according to claim 2, wherein R$_1$ and R$_2$ designate similar alkyl radicals.

4. Process according to claim 2, wherein R$_5$ and R$_6$ designate similar alkyl radicals.

5. Process according to claim 1, wherein said olefin is a member selected from the group consisting of α-olefins and 1,1-dialkyl ethylene.

6. Process according to claim 1, wherein said olefin is a lower olefin.

7. Process according to claim 6, wherein said olefin is ethylene.

8. Process according to claim 1, wherein said olefin contains from 2–20 carbon atoms.

9. Process according to claim 8, wherein said olefin contains from 2–12 carbon atoms.

10. Process according to claim 1, which comprises effecting the reaction at a temperature within the range of 120–200° C.

11. Process according to claim 1, which comprises effecting the reaction at a temperature within the range of 160–200° C.

12. Process according to claim 1, which comprises effecting the reaction at an atmospheric pressure.

13. Process according to claim 1, which comprises effecting the reaction at an elevated pressure.

14. Process according to claim 13, wherein said olefin is ethylene and said reaction is effected at a pressure of between 20 and about 50 atmospheres.

15. Process according to claim 1, which comprises effecting said reaction in the presence of an inert solvent selected from the group consisting of saturated aliphatic hydrocarbons and cycloaliphatic hydrocarbons.

16. Process according to claim 1, which comprises effecting said reaction in the presence of inert gas.

17. Process according to claim 1, wherein said complex alkali metal boron triorgano hydride is a complex of sodium hydride and a compound selected from the group consisting of boron trialkyls, boron cyclo alkanes of the formula

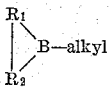

and alkylene diborocyclo alkanes of the formula

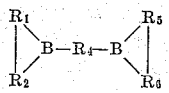

wherein each of R$_1$, R$_2$, R$_4$, R$_5$, and R$_6$ are alkylene radicals.

18. A process of producing a complex alkali metal boron tetraalkyl compound, which comprises reacting an alkali metal hydride, a boron alkyl and an olefin at a temperature in excess of 120° C. and in the absence of any catalyst, and recovering the complex alkali metal boron tetraalkyl compound thereby formed.

19. A two-stage process of producing a complex alkali metal boron tetraalkyl compound which includes reacting in a first reaction stage an alkali metal hydride with a boron alkyl compound and reacting the alkali metal boron alkyl hydride reaction product thereby formed in a second reaction stage with an olefin at a temperature in excess of 120 °C. and in the absence of any catalyst, and recovering the complex alkali metal boron tetraalkyl compound from the reaction mixture.

References Cited in the file of this patent

UNITED STATES PATENTS 3,026,356   Brown _____ Mar. 20, 1962
3,055,945   Honeycutt _____ Sept. 25, 1962